US010001266B2

(12) United States Patent
Lim et al.

(10) Patent No.: US 10,001,266 B2
(45) Date of Patent: Jun. 19, 2018

(54) TRAPEZOIDAL PIR SENSOR LENS

(71) Applicant: Cree, Inc., Durham, NC (US)

(72) Inventors: Jin Hong Lim, Cary, NC (US); Jason Taylor, Cary, NC (US); Kurt S. Wilcox, Libertyville, IL (US)

(73) Assignee: Cree, Inc., Durham, NC (US)

( * ) Notice: Subject to any disclaimer, the term of this patent is extended or adjusted under 35 U.S.C. 154(b) by 245 days.

(21) Appl. No.: 14/745,854

(22) Filed: Jun. 22, 2015

(65) Prior Publication Data

US 2016/0369991 A1 Dec. 22, 2016

(51) Int. Cl.

| | |
|---|---|
| ***F21V 15/00*** | (2015.01) |
| ***F21V 23/04*** | (2006.01) |
| ***G01J 1/02*** | (2006.01) |
| ***G01J 1/04*** | (2006.01) |
| ***G02B 3/08*** | (2006.01) |
| ***G01J 1/42*** | (2006.01) |
| ***F21S 8/04*** | (2006.01) |
| ***F21V 7/00*** | (2006.01) |

(52) U.S. Cl.

CPC ............ *F21V 23/0471* (2013.01); *F21S 8/04* (2013.01); *F21V 7/0008* (2013.01); *G01J 1/0266* (2013.01); *G01J 1/0411* (2013.01); *G01J 1/4204* (2013.01); *G02B 3/08* (2013.01); *F21V 23/0464* (2013.01)

(58) Field of Classification Search

CPC F21V 23/0471; F21V 23/0464; G01J 1/0266; G01J 1/0411; G01J 1/4204; G02B 3/08

USPC .......................................................... 362/362

See application file for complete search history.

(56) References Cited

U.S. PATENT DOCUMENTS 5,712,622 A * 1/1998 Grossinger .......... G08B 13/193 340/555
6,175,309 B1 * 1/2001 Drake .................. G08B 13/193 250/342
7,507,000 B2 * 3/2009 Cho ........................ H04M 1/22 362/23.18

(Continued)

OTHER PUBLICATIONS

Author Unknown, "Ceiling/Wall Mount Occupancy Sensors," Product Information, www.wattstopper.com/categories/sensors/ceiling-wall-mount-sensors.aspx#.V3FR5alYPD8, retrieved Jun. 23, 2016, WattStopper, pp. 1-5.

(Continued)

*Primary Examiner* — Elmito Breval
*Assistant Examiner* — Jessica M Apenteng
(74) *Attorney, Agent, or Firm* — Withrow & Terranova, P.L.L.C.

(57) ABSTRACT

A sensor module for a lighting fixture includes a housing configured to be mounted to a lighting fixture, a light sensor mounted in the housing, and a sensor cover over the light sensor. The sensor cover includes a parallel surface and an angled surface. The parallel surface is parallel to a task surface within an area of interest, and includes a first number of lens sections, each of which are configured to focus light from a different portion of a first subset of the task surface to the light sensor. The angled surface includes a second number of lens sections, each of which extend from an edge of the parallel surface to form a facet of the angled surface and are configured to focus light from a different portion of a second subset of the task surface to the light sensor.

24 Claims, 16 Drawing Sheets

(56) References Cited

U.S. PATENT DOCUMENTS

| | | | | |
|---|---|---|---|---|
| 8,049,639 | B2 * | 11/2011 | Sibalich | F21S 8/02<br>340/693.11 |
| 2012/0306377 | A1 * | 12/2012 | Igaki | H05B 33/0854<br>315/151 |
| 2013/0126739 | A1 * | 5/2013 | Oi | G01J 1/0266<br>250/353 |
| 2015/0204491 | A1 * | 7/2015 | Yuan | F21V 5/007<br>362/311.02 |

OTHER PUBLICATIONS

Author Unknown, "Trans-Pir Occupancy Sensor," Product Information, www.irtec.com/en-irt/products/occupancy-sensors/TRANS-PIR-occupancy-sensor, retrieved Jun. 27, 2016, IR-TEC International Ltd., pp. 1-3.

Author Unknown, "Trans-Duo Occupancy Sensor," Product Information, www.irtec.com/en-irt/products/occupancy-sensors/TRANS-DUO-occupancy-sensor, retrieved Jun. 23, 2016, IR-TEC International Ltd., pp. 1-2.

* cited by examiner

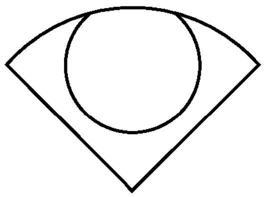

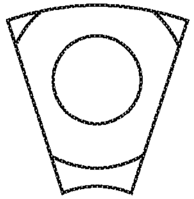

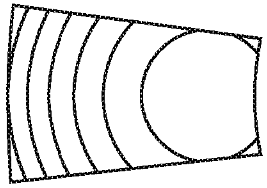

| | | | |
|---|---|---|---|
| Lens Section Details | F 8.9mm<br>Max Depth 0.3mm<br>Max Width 0.9mm<br>Thickness 0.5mm | F 10.2mm<br>Max Depth 0.3mm<br>Max Width 1.02mm<br>Thickness 0.5mm | F 9.0mm<br>Max Depth 0.30mm<br>Max Width 1.2mm<br>Thickness 0.5mm |
| Lens Section Geometry | Center of segment (0, 1.7)<br>Radius 2.5mm | Center of segment (0, 5.0mm)<br>Piece angle 36deg<br>Inner radius 2.50m<br>Outer radius 6.73mm | Center of segment (7.35, 8.16mm)<br>Piece angle 22.5deg @<br>radius by 10.88mm<br>Element tilted by 51.78deg<br>Inner radius 6.73mm |

*FIG. 6D*

TRAPEZOIDAL PIR SENSOR LENS

FIELD OF THE DISCLOSURE

The present disclosure relates to sensor modules for lighting fixtures.

BACKGROUND

Modern lighting fixtures continue to evolve, incorporating features such as controllers, sensors, remote modules, and the like. These controllers, sensors, and remote modules may allow a lighting fixture to implement lighting programs, respond to the surrounding environment, and be controlled, for example, over a local area network and/or the Internet. A number of different sensors may be incorporated into a lighting fixture in order to provide information about the surrounding environment. For example, a lighting fixture may include an ambient light sensor to gather information about the ambient light level in the area around the lighting fixture. Additionally, a lighting fixture may include an occupancy sensor to detect when an individual is located near the lighting fixture. While referred to herein as "light sensors," the sensors discussed herein may detect energy either within the visual spectrum or outside of the visual spectrum (e.g., infrared energy). Incorporating sensors such as those discussed above into a lighting fixture often provides valuable information that can be used to implement additional functionality within a lighting fixture. Generally, sensors such as those mentioned above that measure light or other energy of one kind or another must have a line-of-sight to the surrounding environment. Further, it is often desirable to give these light sensors access to the largest possible area surrounding a lighting fixture in order to provide the maximum amount of information about the surrounding area. In other cases, it is desirable to provide a precise detection area for a light sensor. Generally, the particular goal of the light sensor will dictate the extent of the desirable coverage area.

When incorporating a sensor into a sensor module, the sensor generally must be covered by a sensor cover of some kind. Due to the requirements of many light-based sensors discussed above (i.e., line-of-sight to surrounding environment and access to a large surrounding area), sensor modules incorporating light sensors often include bulky and aesthetically unappealing sensor covers. For example, many conventional sensor modules include dome shaped sensor covers, and therefore substantially extrude from a lighting fixture, detracting from the aesthetic appeal thereof. Due to the size of these sensor module covers, many are located remotely from the lighting fixtures that they service, requiring separate installation and providing only limited information about the area directly surrounding the lighting fixture itself. Further, the detection area of these sensor covers is often limited.

Accordingly, there is a need for a sensor module for a lighting fixture including a compact sensor cover capable of capturing light from a large surrounding area.

SUMMARY

The present disclosure relates to sensor modules for lighting fixtures. In one embodiment, a sensor module for a lighting fixture includes a housing configured to be mounted to a lighting fixture, a light sensor mounted in the housing, and a sensor cover over the light sensor. The sensor cover includes a parallel surface and an angled surface. The parallel surface is parallel to a task surface within an area of interest, and includes a first number of lens sections, each of which are configured to focus light from a different portion of a first subset of the task surface to the light sensor. The angled surface includes a second number of lens sections, each of which extend from an edge of the parallel surface to form a facet of the angled surface and are configured to focus light from a different portion of a second subset of the task surface to the light sensor. By including both the parallel surface and the angled surface, a larger portion of light from the task surface can be uniformly sampled, thereby providing more comprehensive information about the surrounding environment to the light sensor.

In one embodiment, the light sensor is an infrared occupancy sensor.

In one embodiment, each one of the first number of lens sections and the second number of lens sections each comprises a Fresnel lens. Further, the first number of lens sections may have a Fresnel pattern that is different from that of the second number of lens sections.

In one embodiment, the first number of lens sections and the second number of lens sections collectively have a uniform field of view corresponding to a circular area greater than 706 $ft^2$ for a working distance of about 12.5 ft. In another embodiment, the first number of lens sections and the second number of lens sections collectively have a uniform field of view corresponding to a circular area greater than 1385 $ft^2$ for a working distance of about 21.5 ft.

In one embodiment, a lighting fixture includes a light source, a housing coupled to the light source, a light sensor, and a sensor cover coupled to the housing and over the light sensor. The housing includes an opening through which light generated by the light source is emitted towards a task surface within area of interest. The sensor cover includes a parallel surface and an angled surface. The parallel surface is parallel to the task surface, and includes a first number of lens sections, each of which are configured to focus light from a different portion of a first subset of the task surface to the light sensor. The angled surface includes a second number of lens sections, each of which extend from an edge of the parallel surface to form a facet of the angled surface and are configured to focus light from a different portion of a second subset of the task surface to the light sensor. By including both the parallel surface and the angled surface, a larger portion of light from the task surface can be uniformly sampled, thereby providing more comprehensive information about the surrounding environment to the light sensor.

In one embodiment, the light sensor is an infrared occupancy sensor.

In one embodiment, the first number of lens sections and the second number of lens sections each comprises a Fresnel lens. Further, the first number of lens sections may have a Fresnel pattern that is different from that of the second number of lens sections.

In one embodiment, the first number of lens sections and the second number of lens sections collectively have a uniform field of view corresponding to a circular area greater than 706 $ft^2$ for a working distance of about 12.5 ft. In another embodiment, the first number of lens sections and the second number of lens sections collectively have a uniform field of view corresponding to a circular area greater than 1385 $ft^2$ for a working distance of about 21.5 ft.

In one embodiment, the lighting fixture further comprises control circuitry configured to receive one or more measurements from the light sensor and adjust a light output of the light source based on the one or more measurements.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 6A through 6D illustrate a sensor cover according to one embodiment of the present disclosure.

DETAILED DESCRIPTION

Figure 1:
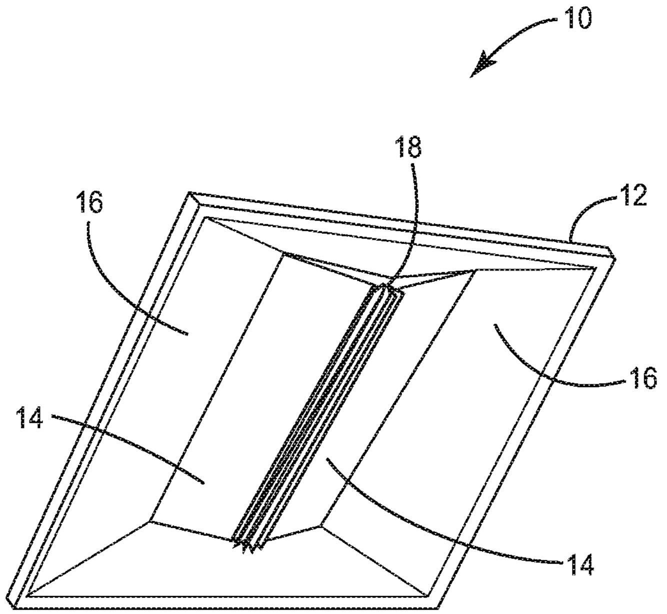
FIG. 1 illustrates a lighting fixture according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Prior to delving into the details of the present disclosure, an overview of an exemplary lighting fixture is provided. While the concepts of the present disclosure may be employed in any type of lighting system, the immediately following description describes these concepts in a troffer-type lighting fixture, such as the lighting fixture 10 illustrated in FIGS. 1-3. This particular lighting fixture is substantially similar to the CR and CS series of troffer-type lighting fixtures that are manufactured by Cree, Inc. of Durham, N.C.

While the disclosed lighting fixture 10 employs an indirect lighting configuration wherein light is initially emitted upward from a light source and then reflected downward, direct lighting configurations may also take advantage of the concepts of the present disclosure. In addition to troffer-type lighting fixtures, the concepts of the present disclosure may also be employed in recessed lighting configurations, wall mount lighting configurations, outdoor lighting configurations, and the like. Further, the functionality and control techniques described below may be used to control different types of lighting fixtures, as well as different groups of the same or different types of lighting fixtures at the same time.

Figure 2:
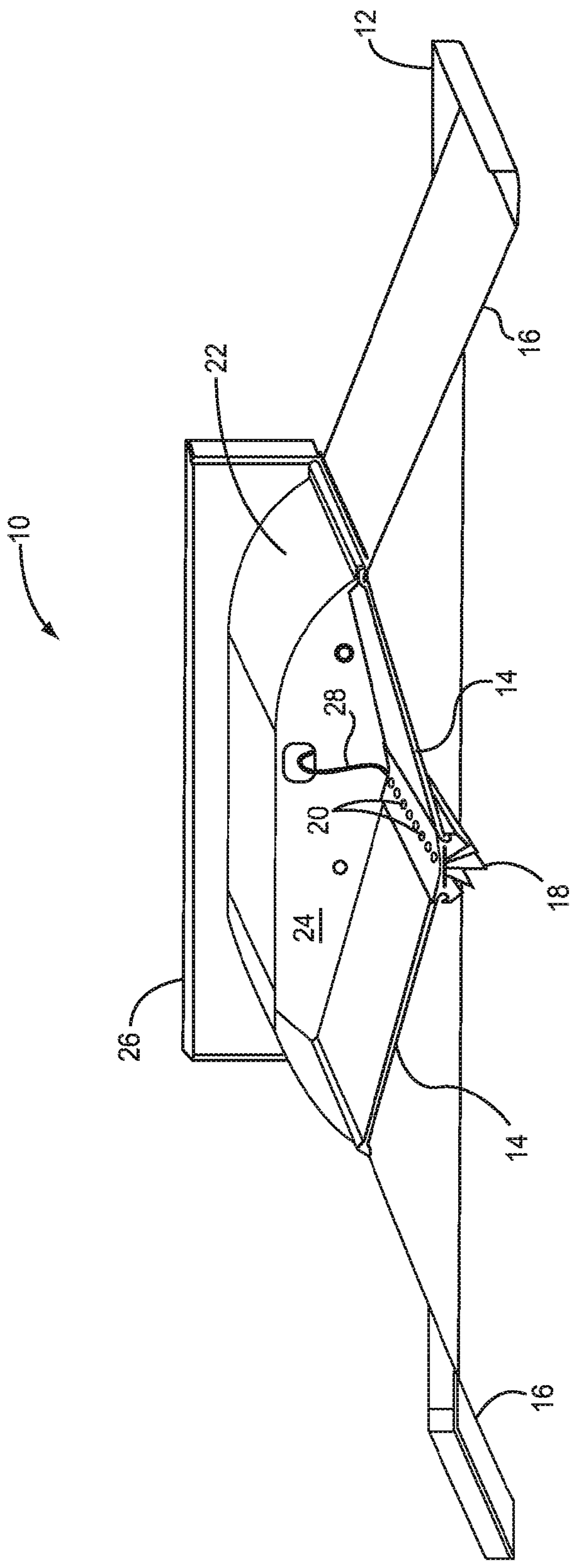
FIG. 2 illustrates a lighting fixture according to an additional embodiment of the present disclosure.
Figure 3:
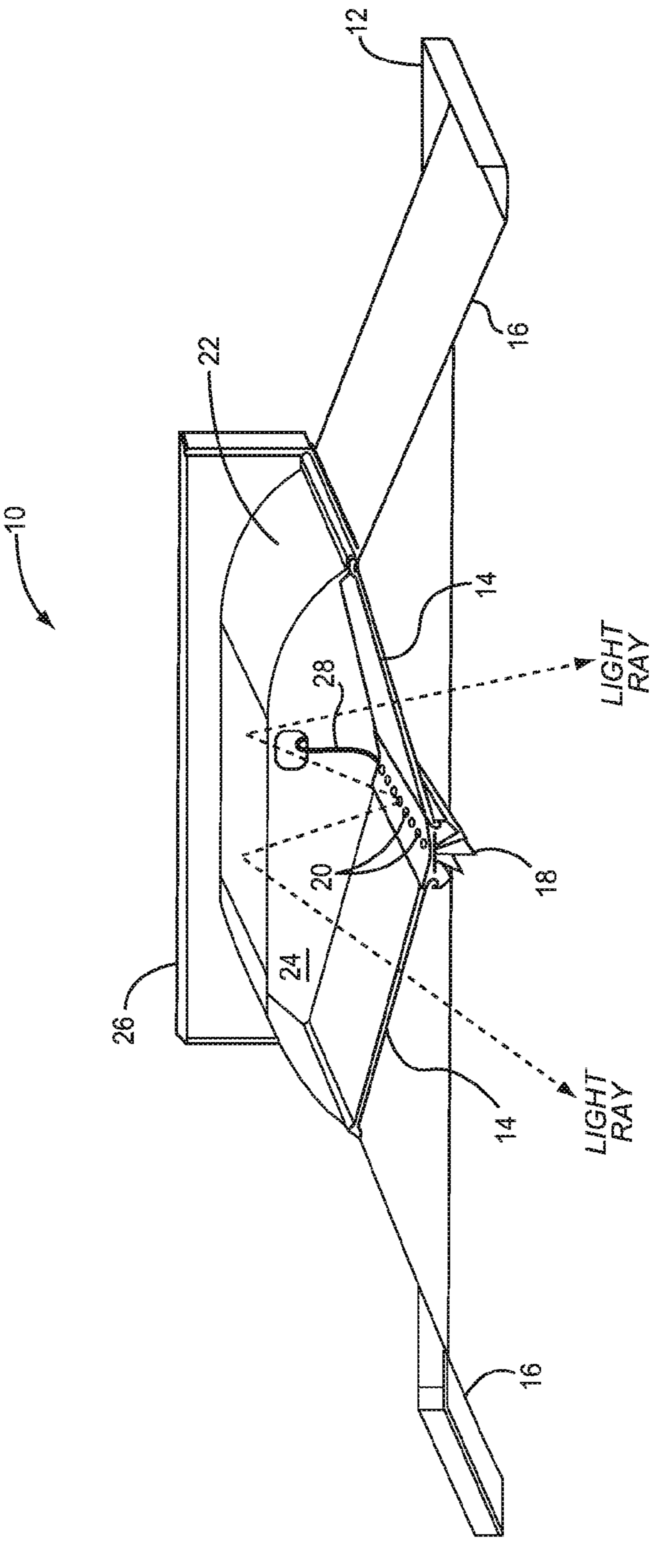
FIG. 3 illustrates a lighting fixture according to an additional embodiment of the present disclosure.

In general, troffer-type lighting fixtures, such as the lighting fixture 10, are designed to mount in a ceiling. In most applications, the troffer-type lighting fixtures are mounted into a drop ceiling (not shown) of a commercial, educational, or governmental facility. As illustrated in FIGS. 1-3, the lighting fixture 10 includes a square or rectangular outer frame 12. In the central portion of the lighting fixture 10 are two rectangular lenses 14, which are generally transparent, translucent, or opaque. Reflectors 16 extend from the outer frame 12 to the outer edges of the lenses 14. The lenses 14 effectively extend between the innermost portions of the reflectors 16 to an elongated heatsink 18, which functions to join the two inside edges of the lenses 14.

Turning now to FIGS. 2 and 3 in particular, the back side of the heatsink 18 provides a mounting structure for an LED array 20, which includes one or more rows of individual LEDs mounted on an appropriate substrate. The LEDs are oriented to primarily emit light upwards toward a concave cover 22. The volume bounded by the cover 22, the lenses 14, and the back of the heatsink 18 provides a mixing chamber 24. As such, light will emanate upwards from the LEDs of the LED array 20 toward the cover 22 and will be reflected downward through the respective lenses 14 towards an area of interest, as illustrated in FIG. 3. As discussed herein, the area illuminated by the lighting fixture 10 is generally referred to as an area of interest, while a particular surface illuminated by the lighting fixture 10 is generally referred to as a task surface. Notably, not all light rays emitted from the LEDs will reflect directly off the bottom of the cover 22 and back through a particular lens 14 with a single reflection. Many of the light rays will bounce around within the mixing chamber 24 and effectively mix with other light rays, such that a desirably uniform light is emitted through the respective lenses 14.

Those skilled in the art will recognize that the type of lenses 14, the type of LEDs, the shape of the cover 22, and any coating on the bottom side of the cover 22, among many other variables, will affect the quantity and quality of light emitted by the lighting fixture 10. As will be discussed in greater detail below, the LED array 20 may include LEDs of different colors, wherein the light emitted from the various LEDs mixes together to form a white light having a desired color temperature and quality based on the design parameters for the particular embodiment.

As is apparent from FIGS. 2 and 3, the elongated fins of the heatsink 18 may be visible from the bottom of the lighting fixture 10. Placing the LEDs of the LED array 20 in thermal contact along the upper side of the heatsink 18 allows any heat generated by the LEDs to be effectively transferred to the elongated fins on the bottom side of the heatsink 18 for dissipation within the room in which the lighting fixture 10 is mounted. Again, the particular configuration of the lighting fixture 10 illustrated in FIGS. 1-3 is merely one of the virtually limitless configurations for lighting fixtures 10 in which the concepts of the present disclosure are applicable.

With continued reference to FIGS. 2 and 3, an electronics housing 26 is shown mounted at one end of the lighting fixture 10, and is used to house all or a portion of the electronics used to power and control the LED array 20. These electronics are coupled to the LED array 20 through appropriate cabling 28.

Figure 4:
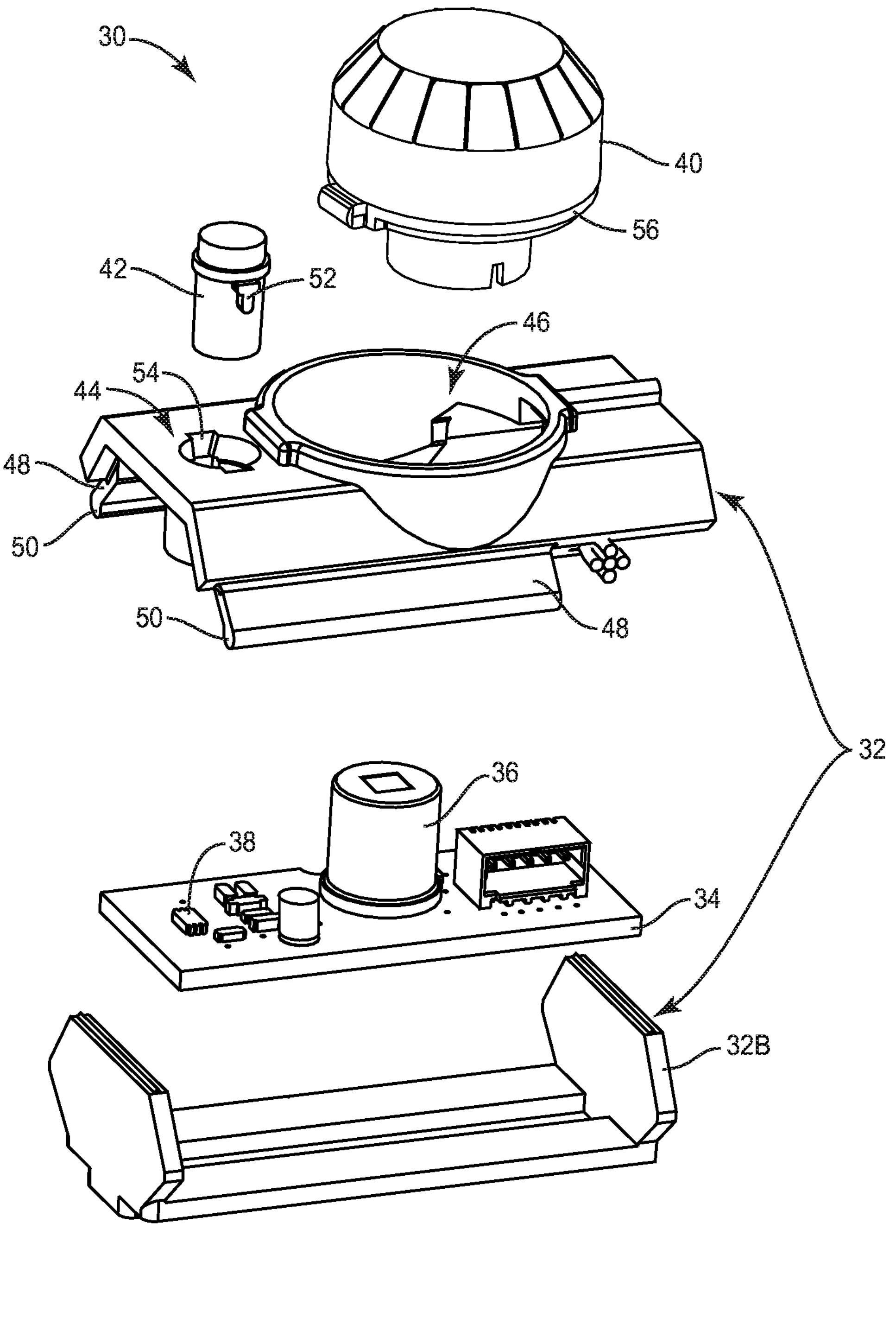
FIG. 4 illustrates a sensor module for a lighting fixture according to one embodiment of the present disclosure.

FIG. 4 shows an exploded view of a sensor module 30 that may be used along with the lighting fixture 10 in various embodiments. The sensor module 30 may be integrated into an exposed side of the heatsink 18 at one end thereof, as discussed in detail below. The sensor module 30 may include one or more sensors, such as occupancy sensors $S_O$, ambient light sensors $S_A$, temperature sensors, sound sensors (microphones), image (still or video) sensors, and the like. If multiple sensors are provided, they may be used to sense the same or different environmental conditions. If multiple sensors are used to sense the same environmental conditions, different types of sensors may be used.

As illustrated in FIG. 4, the sensor module includes a housing 32, which may be divided into an upper housing 32A and a lower housing 32B, each of which is configured to attach to one another through a snap-fit connector or other attachment mechanism, such as via screws. The housing 32 supports a printed circuit board (PCB) 34 including an occupancy sensor 36 and an ambient light sensor 38. The occupancy sensor 36 may be covered by a sensor cover 40, which may be configured to accurately collect light from a particular portion of an area of interest, as discussed in detail below. A light pipe 42 may cover the ambient light sensor 38 in order to guide light from the area of interest to the ambient light sensor 38. In particular, the ambient light sensor 38 is positioned such that it is aligned directly beneath the light pipe 42 when the light pipe 42 is inserted into a light pipe receptacle 44 on the upper housing 32A. The occupancy sensor 36 may be aligned with a sensor cover opening 46 in the upper housing 32A, which is covered by the sensor cover 40. In one embodiment, the occupancy sensor 36 is an off-the-shelf passive infrared (PIR) occupancy sensor. The PCB 34 may include a connector, cabling, or a wire harness (not shown) in order to connect the PCB 34 to other circuitry in the lighting fixture 10.

The sensor module 30 may include opposing mounting tabs 48, which are used to attach the sensor module 30, for example, to the heatsink 18. In one embodiment, the outer edge of the mounting tabs 48 expands to form a bulbous edge 50. Further details regarding the mounting tabs 48 and the bulbous edge 50 are discussed below.

The light pipe 42 may snap into place in the light pipe receptacle 44. While many variants are possible, the side of the light pipe 42 may include one or more male snap-fit features 52, which are designed to releasably engage corresponding female snap-fit features 54 on the upper housing 32A. As illustrated, the light pipe 42 has two opposing male snap-fit features 52 (where only one is visible), and the upper housing 32A has two corresponding female snap-fit features 54.

The light pipe 42 is solid (as opposed to hollow) and may be formed from acrylic, polymer, glass, or the like. The light pipe 42 may include or be formed to provide various types of light filtering. Further, different lengths, configurations, and materials for the light pipe 42 may provide different optical coverage and/or filtering for different light pipes 42 that fit the same light pipe receptacle 44. Light pipes 42 with different optical characteristics, but the same general form factor may be used with a given sensor module 30. As such, the light pipe 42 may be specially selected from a number of different light pipes 42 to optimize the ambient light performance of the ambient light sensor 38 for a particular installation or environment.

The sensor cover 40 may be secured into place in the sensor cover opening 46 via any suitable mechanism. For example, the sensor cover 40 may include a raised lip 56, which may prevent the sensor cover 40 from sliding through the sensor cover opening 46 when the upper housing 32A is secured over the sensor cover 40. The sensor cover 40 may be formed to provide various types of light filtering. Different materials selected for the sensor cover 40 may provide different types of filtering, and thus may be selected based on the particular installation or environment of the lighting fixture 10. In one embodiment, the sensor cover 40 is a material configured to pass infrared light between 7 and 14 microns. For example, the sensor cover 40 may be made of high density poly-ethylene (HDPE), high density polypropylene (HDPP), or the like.

While the sensor cover 40 is shown over the occupancy sensor 36 in FIG. 4, the sensor cover 40 may similarly be used with any other type of light sensor without departing from the principles of the present disclosure.

Figure 5A:
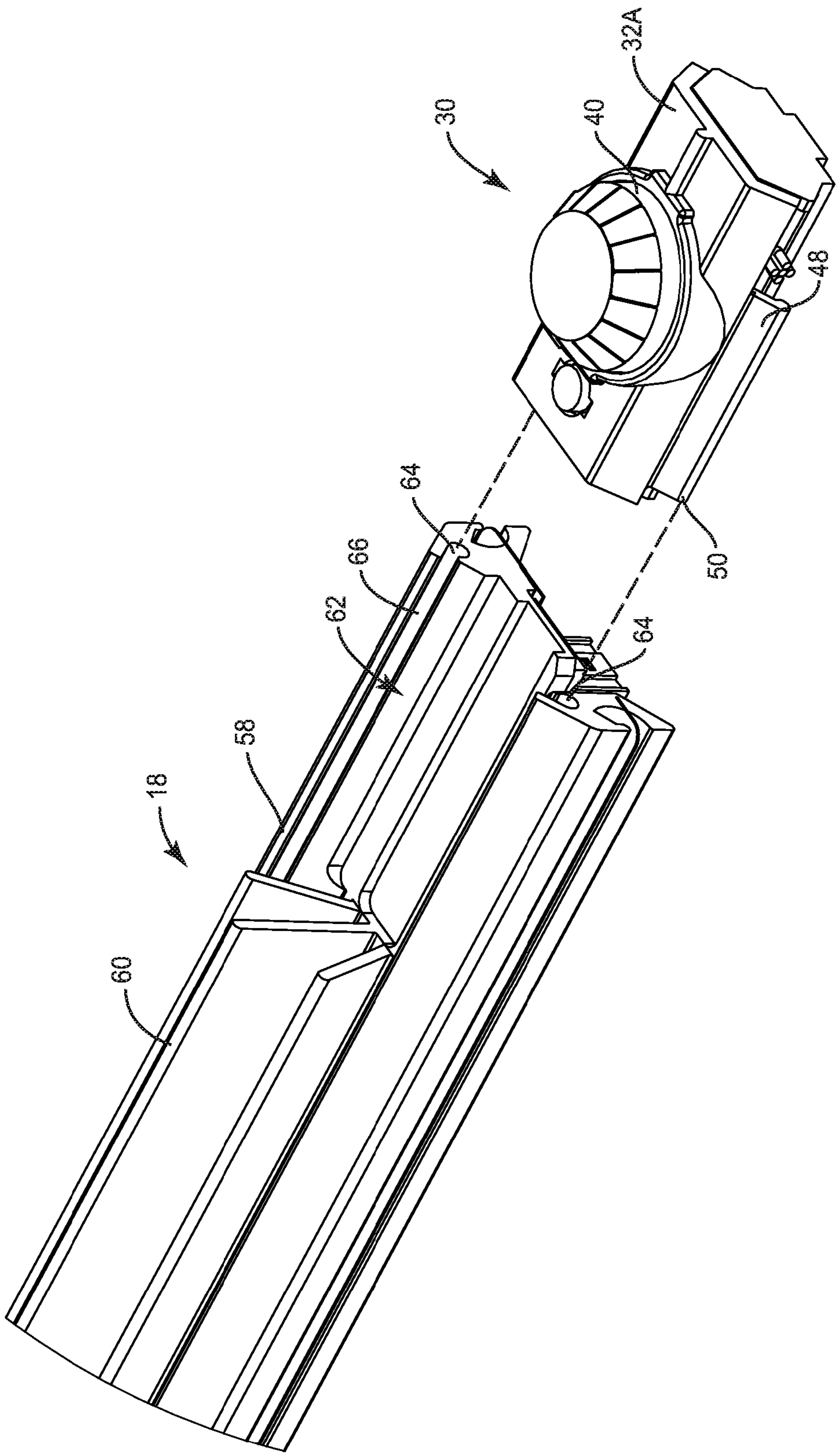
FIGS. 5A through 5D illustrate a sensor module attaching to a heatsink of a lighting fixture according to one embodiment of the present disclosure.

FIGS. 5A through 5D illustrate how the sensor module 30 may be attached to the heatsink 18. As illustrated in FIG. 5A, the heatsink 18 includes a main body 58, a number of fins 60, and a sensor recess 62, which is configured to receive the sensor module 30. In one embodiment, partially open bosses 64 are provided along either side of the sensor recess 62 and are configured to receive the mounting tabs 48 of the sensor module 30. The partially open bosses 64 are essentially deep holes that extend into the end of the heatsink 18 and have an elongated slot 66 that extends along all or a portion of the sides of the holes.

Figure 5B:
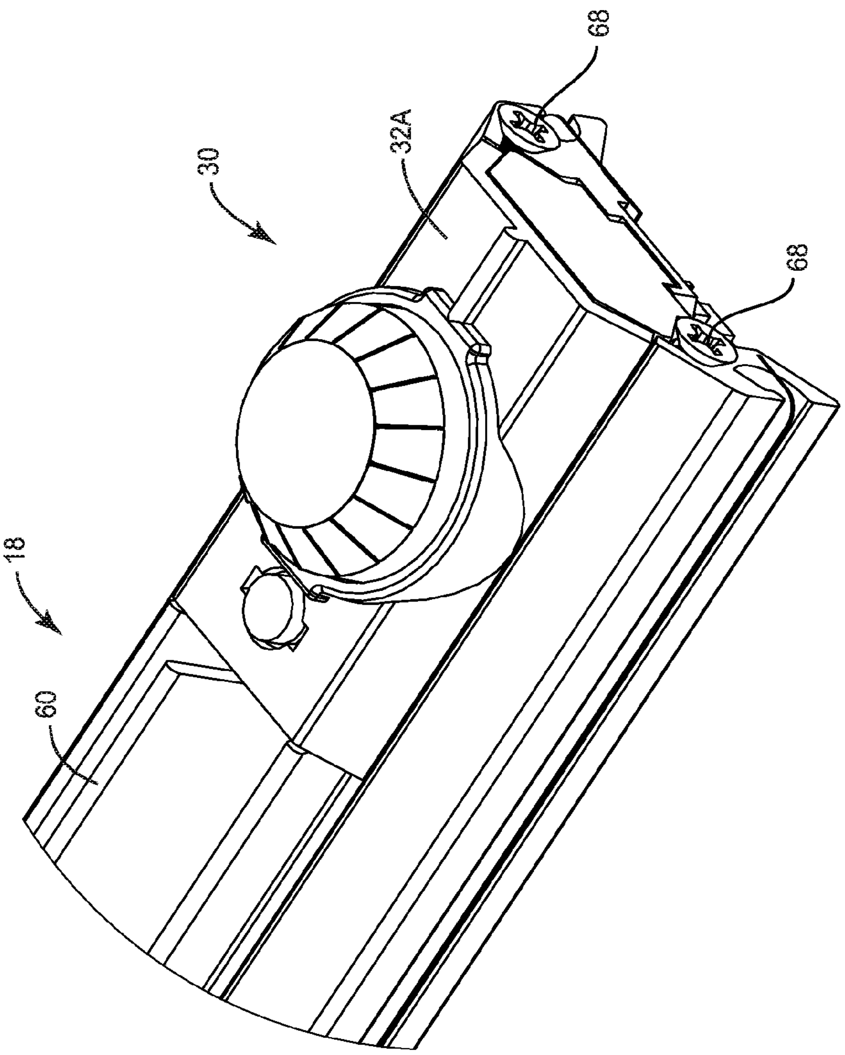

The bulbous edge 50 of each mounting tab 48 are sized and shaped to slide into a corresponding hole of each partially open boss 64. Effectively, the partially open bosses 64 form channels that are configured to receive the mounting tabs 48. FIG. 5B illustrates the sensor module 30 after it is axially slid into the end of the heatsink 18 and into position with the sensor recess 62. In this position, each mounting tab 48 extends through the slot 66 of one of the partially open bosses 64, and the bulbous edge 50 of each mounting tab 48 resides within the hole of the corresponding partially open boss 64.

The mounting tabs 48 and the partially open bosses 64 are configured to prevent the sensor module 30 from being removed from the sensor recess 62 radially while allowing it to slide in and out of the sensor recess 62 axially. As shown in FIG. 5B, a number of end cap mounting screws 68 may be partially threaded into a respective one of the partially open bosses 64 in order to secure the sensor module 30 into the sensor recess 62.

When aesthetics are important, the exposed surfaces of the sensor module 30, such as the upper housing 32A, are shaped to allow the sensor module to aesthetically blend in with the heatsink 18. For example, the angled side walls of the upper housing 32A continue the plane of the angled side walls of the main body 58 of the heatsink 18. The transition point between the angled side walls and the surface extending between the side walls of the upper housing 32A aligns with the outer fins 60 of the heatsink 18. The upper housing 32A and the lower housing 32B may have the same color as the heatsink 18. Further, the materials used to form the upper housing 32A and the lower housing 32B may be matched to the materials used for the heatsink 18. If the upper housing 32A and/or the lower housing 32B are formed of a conductive material, the PCB 34 will need to be electrically isolated therefrom. Forming the upper housing 32A and/or the lower housing 32B from insulating materials will provide electrical insulation for the PCB 34, the occupancy sensor 36, the ambient light sensor 38, and any other electrical components within the sensor module 30.

Figure 5C:
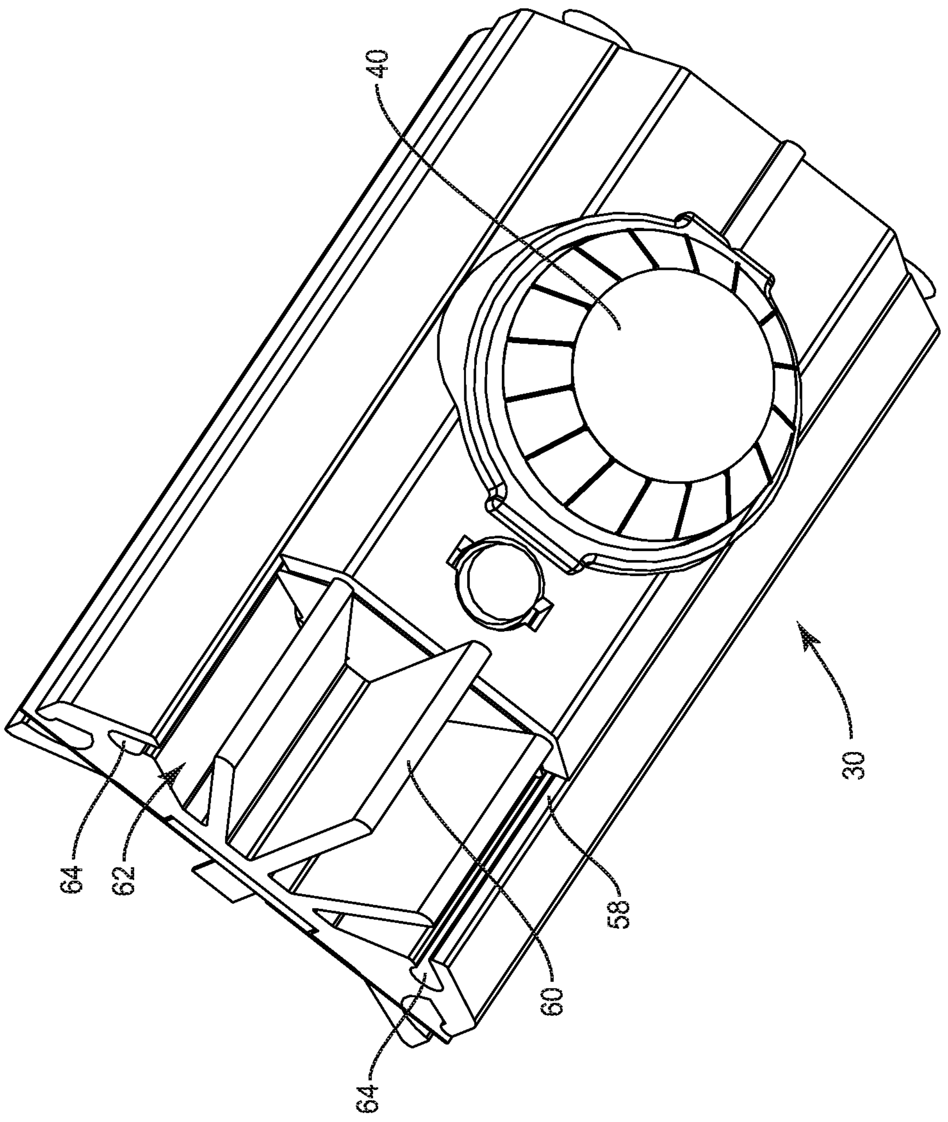
Figure 5D:
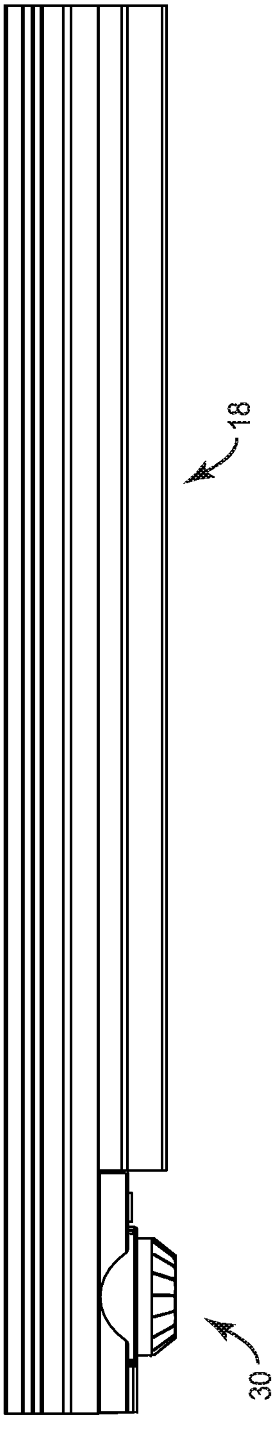

FIGS. 5C and 5D show the attached sensor module 30 and heatsink 18 from various angles thereof. Specifically, FIG. 5C shows an isometric front view of the sensor module 30 attached to the heatsink 18, while FIG. 5D shows a side view of the sensor module 30 attached to the heatsink 18.

Figure 6A:
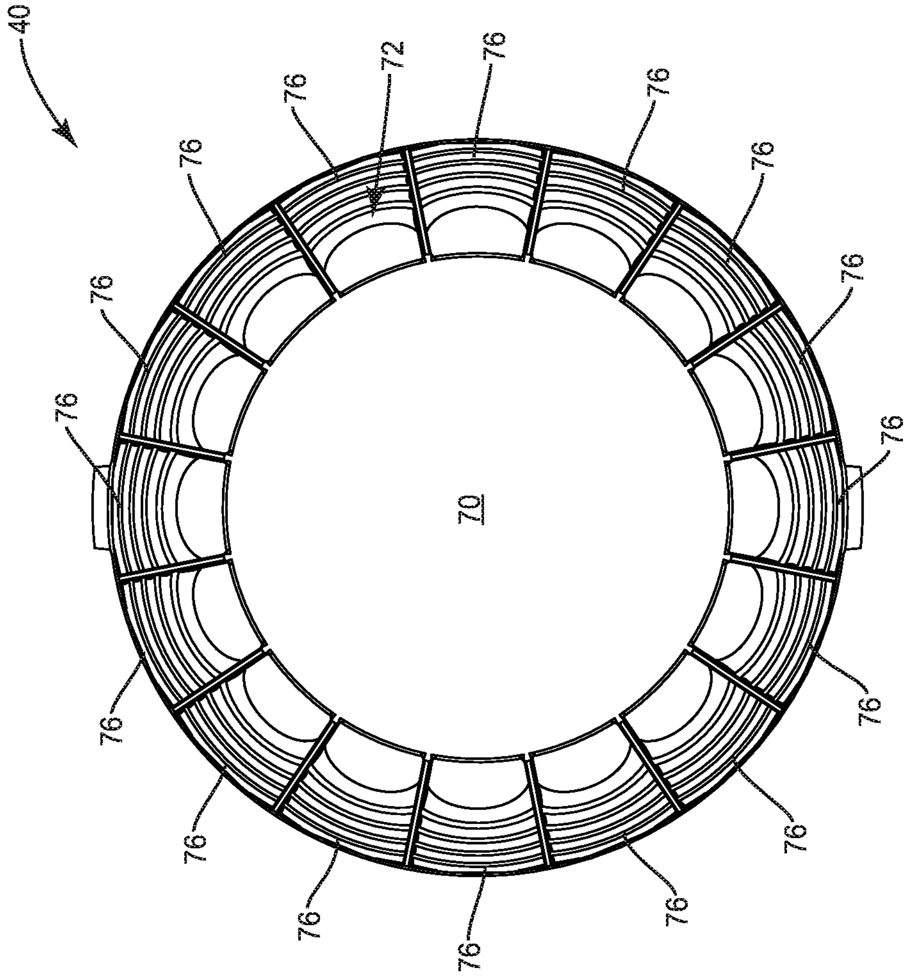
Figure 6B:
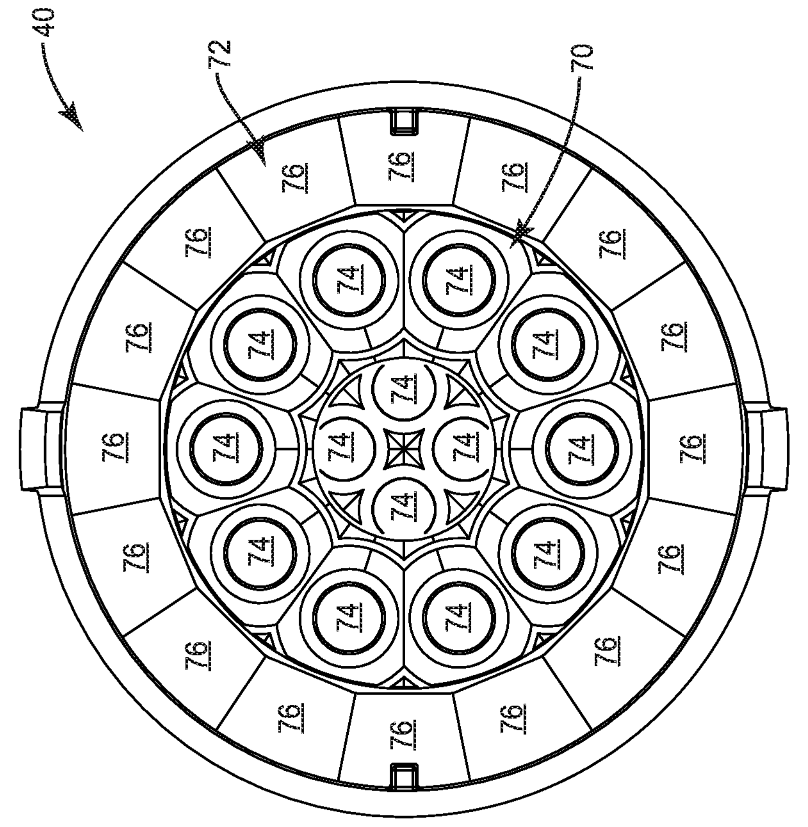
Figure 6C:
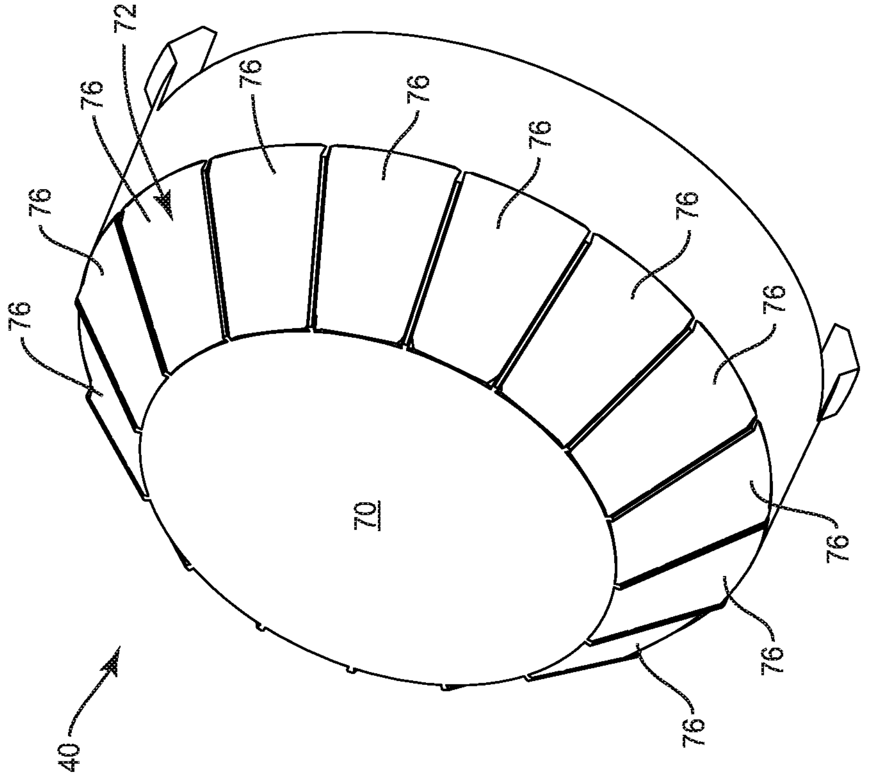

As discussed above, the sensor cover 40 is configured to provide light from a particular portion of an area of interest to the occupancy sensor 36. Details of the sensor cover 40 are shown in FIGS. 6A through 6C. Specifically, FIG. 6A shows a front view of the sensor cover 40, FIG. 6B shows a back view of the sensor cover 40, and FIG. 6C shows an isometric view of the front of the sensor cover 40. As shown in FIGS. 6A and 6B, the sensor cover includes a parallel surface 70 and an angled surface 72 surrounding the parallel surface 70. The parallel surface 70 is oriented such that it is parallel to a task surface within an area of interest, while the angled surface 72 is angled with respect to the parallel surface 70, generally in a direction that is away from the task surface. Each one of the parallel surface 70 and the angled surface 72 include a set of lens sections configured to focus light from different portions of the task surface. In particular, the parallel surface 70 of the sensor cover 40 includes a first set of lens sections 74, while the angled surface 72 of the sensor cover 40 includes a second set of lens sections 76, each of which form a different facet of the angled surface 72. As discussed herein, a facet is a single side of a particular surface. Accordingly, the angled surface 72 may include many different sides, each of which are coupled at the edges to form the trapezoidal shape shown in the Figures. The first set of lens sections 74 may be located on a back side of the sensor cover 40, while the second set of lens sections 76 may be located on a front side of the sensor cover 40, however, the disclosure is not so limited. The first set of lens sections 74 and the second set of lens sections 76 may be located on either one of the front or back side of the sensor cover 40 without departing from the principles of the present disclosure.

The first set of lens sections 74 may each be Fresnel lenses configured to focus light (which may be, for example, infrared light with a wavelength between 7 to 14 microns as is typical for that radiated from the human body) from a different portion of a first subset of the task surface within the area of interest to the occupancy sensor 36. Further, the first set of lens sections 74 may be broken down in to a first subset of lens sections 74A and a second subset of lens sections 74B. The second set of lens sections 76 may similarly each be Fresnel lenses configured to focus light from a different portion of a second subset of the task surface to the occupancy sensor 36. While Fresnel lenses are often not of sufficient quality for use with imaging optics, they provide large aperture and short focal lengths while remaining relatively compact. Fresnel lenses generally include a flat surface and a number of ridges, referred to herein as Fresnel ridges, used to focus incident light to a focal point. The particular number, angle, and depth of the Fresnel ridges of a Fresnel lens determine the aperture, the focal point, and field of view of the lens. The particular Fresnel pattern of each one of the first set of lens sections 74 and the second set of lens sections 76 may be tailored to a particular environment or application. For example, the particular Fresnel pattern of each one of the first set of lens sections 74 and the second set of lens sections 76 may be chosen to provide a particular coverage area of the area of interest, as discussed in detail below. In one embodiment, the first set of lens sections 74 have a different Fresnel pattern than the second set of lens sections 76. Further, the first subset of lens sections 74A may have a different Fresnel pattern than the second subset of lens sections 74B.

It may often be desirable to maximize the portion of the task surface for which information is captured by the sensor module 30. By providing the first set of lens sections 74 on the parallel surface 70 of the sensor cover 40 and the second set of lens sections 76 on the angled surface 72 of the sensor cover 40 (i.e., by providing a trapezoidally shaped sensor cover 40 including a number of different lens sections), a large sample of the task surface may be viewed by the occupancy sensor 36. Further, the shape of the sensor cover 40 may provide enhancements to the uniformity of the detection area of the occupancy sensor 38, thereby enhancing the performance thereof. That is, while many conventional sensor covers include one or more blind spots or irregular coverage areas, the sensor cover 40 described herein provides a uniform coverage area within the desired portion of the task surface.

Due to the fact that the different lens sections are configured to focus light from different portions of the task surface, some of which may be further away from the sensor cover 40 than others, some of the lens sections may provide more light to the occupancy sensor 38 than others. Providing a different amount of light to the occupancy sensor 38 from different portions of the task surface may result in a loss in the uniformity of detection across the desired portion of the task surface. That is, providing a different amount of light to the occupancy sensor 38 from different portions of the sensor cover 40 may result in hot spots and/or cold spots wherein detection is enhanced and/or degraded, respectively, in a particular area. Accordingly, in one embodiment the first set of lens sections 74 and the second set of lens sections 76 are designed to allow substantially the same amount of light to pass to the occupancy sensor 38. Accordingly, the first set of lens sections 74 may not be the same size as the second set of lens sections 76 in many embodiments of the sensor cover 40. Further, the first subset of lens sections 74A may not be the same size as the second subset of lens sections 74B. In general, those lens sections receiving less light from the task surface, for example, due to the fact that they are configured to collect light from a portion of the task surface that is relatively far away from the sensor cover, may be sized larger than those receiving more light from the task surface in order to normalize the light collection of the various lens sections of the sensor cover 40. The same applies to the lens sections in the first subset of lens sections 74A and the second subset of lens sections 74B. In one embodiment, the first set of lens sections 74 and the second set of lens sections 76 are designed such that the amount of light passed to the occupancy sensor 38 by each one of the lens sections in the first set of lens sections 74 differs from the amount of light passed to the occupancy sensor 38 by each one of the lens sections in the second set of lens sections 76 by less than about $6.5*10^{-8}$ W/mm$^2$. The same may apply to the first subset of lens sections 74A and the second subset of lens sections 74B. In addition to the size of the lens sections, the particular Fresnel pattern of each one of the first set of lens sections 74 and the second set of lens sections 76 may dictate the amount of light passed from each one of the lens sections, and may be easily changed by a designer in order to achieve a uniform detection area by the sensor cover 40. In various embodiments, the particular Fresnel pattern of each one of the first set of lens sections 74 and each one of the second set of lens sections 76 may be unique with respect to one another. Additionally, the particular Fresnel pattern of each one of the first subset of lens sections 74A and each one of the second subset of lens sections 74B may also be unique with respect to one another.

In one embodiment, the occupancy sensor 38 is a four-quadrant passive infrared (PIR) occupancy sensor configured to detect occupancy based on movement of an infrared energy signature detected between two or more of the quadrants of the sensor, the details of which are well known in the art. The first set of lens sections 74 and the second set of lens sections 76 may be designed to break a desired portion of the task surface into a relatively large number of sections, which enhances the detectability of infrared energy signatures by the occupancy sensor 38 by making sure that a transition in infrared energy occurs between at least two quadrants in the occupancy sensor 38 with even the slightest movement of an infrared energy signature within the task surface. Accordingly, the occupancy sensor 38 will experience fewer false negative occupancy events when using the sensor cover 40 as compared to a conventional sensor cover.

The sensor cover 40 may be manufactured by any number of processes. In one embodiment, the sensor cover 40 is molded via an injection molding process. In another embodiment, the sensor cover 40 is milled out of a piece of material, for example, via a computer numerical control (CNC) router or mill. In yet another embodiment, the sensor cover 40 is printed via a three-dimensional (3D) printer. In one embodiment, the positioning of the first set of lens sections 74 and/or the second set of lens sections 76 may be decided based on the particular manufacturing process for the sensor cover 40. For example, an injection molding process may prevent the placement of a lens section at the center point of the part, which may change the pattern of the lens sections in the sensor cover 40.

The parallel surface 70 of the sensor cover 40 may be limited to a relatively small coverage area due to the fact that it is parallel to a task surface within the area of interest. The angled surface 72 may be capable of focusing light from a broader area, thereby providing a greater coverage area and providing more information to the occupancy sensor 36.

FIG. 6D shows details of a single lens section in each one of the first subset of lens sections 74A, the second subset of lens sections 74B, and the second set of lens sections 76. Specifically, the particular Fresnel pattern, as well as the corresponding lens section details and geometry are shown for a single lens section in each one of the first subset of lens sections 74A, the second subset of lens sections 74B, and the second set of lens sections 76.

Figure 7:
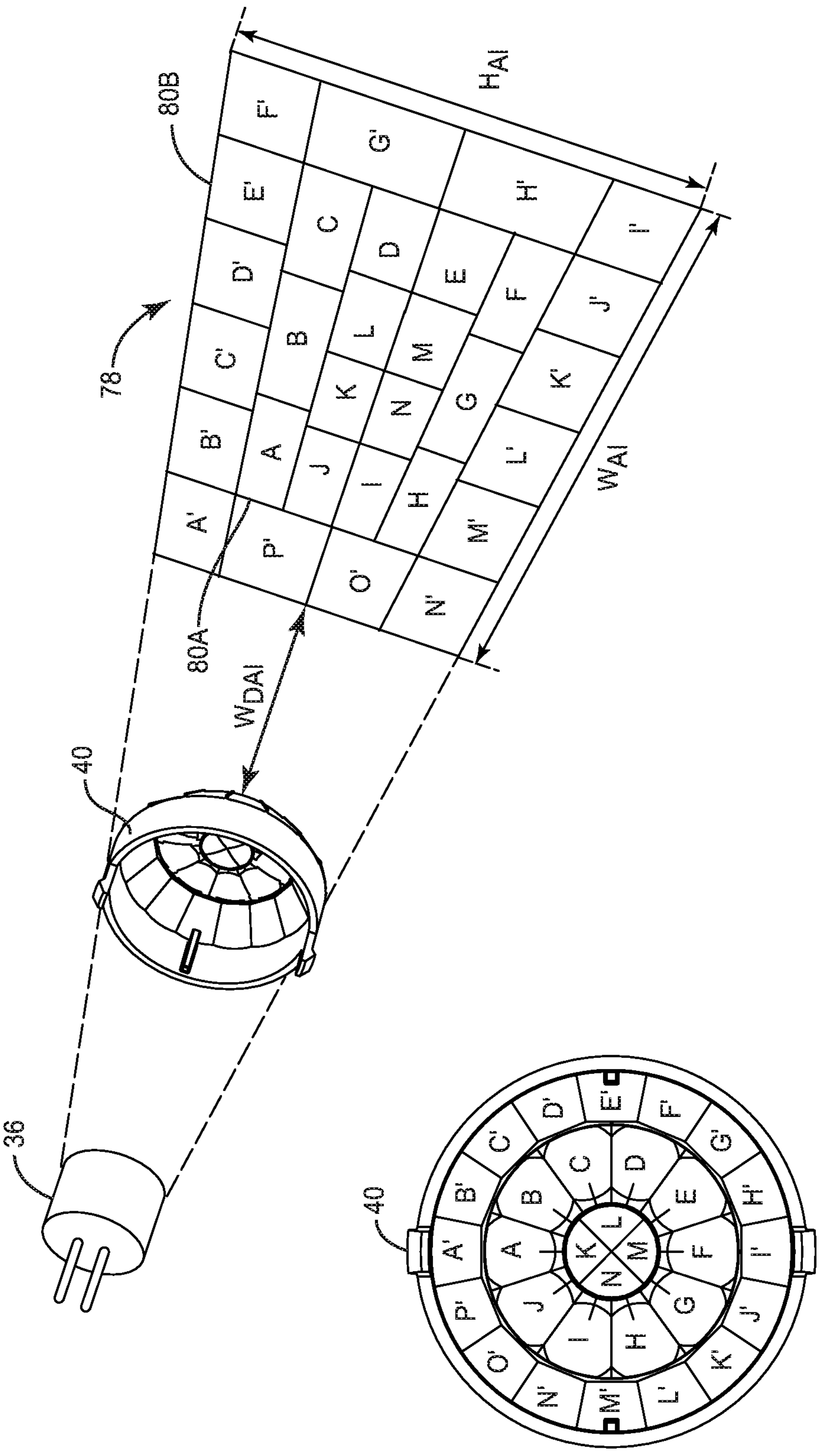
FIG. 7 illustrates the operation of a sensor cover according to one embodiment of the present disclosure.

FIG. 7 shows details of the operation of the sensor cover 40 according to one embodiment of the present disclosure. Specifically, FIG. 7 shows a desired portion of a task surface 78 within an area of interest in front of the sensor cover 40, and the occupancy sensor 36 aligned with a focal point at the back of the sensor cover 40. The desired portion of the task surface 78 is broken up into a first section 80A and a second section 80B, which are in turn broken into a first number of sub-sections A-J and a second number of sub-sections A'-P'. Each one of the first set of lens sections 74 is configured to focus light from one of the first number of sub-sections A-J of the first section 80A, while each one of the second set of lens sections 76 is configured to focus light from one of the second number of sub-sections A'-P' of the second section 80B. Accordingly, the first set of lens sections 74 and the second set of lens sections 76 collectively provide the occupancy sensor 36 with information about the desired portion of the task surface 78. The particular sub-section of the desired portion of the task surface 78 captured by a particular lens section is merely exemplary in FIG. 7. That is, each lens section may focus light from any one of the different sub-sections of the area of interest without departing from the principles of the present disclosure.

In various embodiments, the first set of lens sections 74 and the second set of lens sections 76 may include more or less lens sections than depicted in the Figures herein. Providing additional lens sections will split the desired portion of the task surface 78 into more sections than depicted in FIG. 7.

The desired portion of the task surface 78 is defined by a width $W_{AI}$ and a height $H_{AI}$, which define an area referred to as the field of view (FOV). While illustrated as a rectangular area, the FOV may also be defined as a circular area. As discussed above, it is often desirable to maximize a FOV in order to provide the occupancy sensor 36 with as much information as possible about the surrounding environment, or to precisely define the FOV for a particular environment and/or application. Due to the design of the sensor cover 40, a working distance $WD_{AI}$ (defined as the distance from the occupancy sensor 36 to the desired portion of the task surface 78) of 12.5 ft may provide uniform detection coverage over the desired portion of the task surface 78 with a diameter of about 30 ft for a field of view of about 706 $ft^2$, which is substantially larger than a uniform detection area achievable by conventional means. In an additional embodiment, a working distance $WD_{AI}$ of 21.5 ft may provide uniform detection coverage over the desired portion of the task surface 78 with a diameter of about 42 ft for a field of view of about 1385 $ft^2$. Adjusting the Fresnel pattern of each lens section in the sensor cover 40 allows a designer to tailor the particular FOV to a particular working distance, application, and/or environment, thereby increasing the utility of the sensor cover 40. While FOV is discussed above as defining a particular area, FOV may sometimes describe an angle subtended to the same area. For a circular area, FOV is frequently used for the angle subtended to the diameter of the circular area, which is about 100° in one embodiment.

Figure 8A:
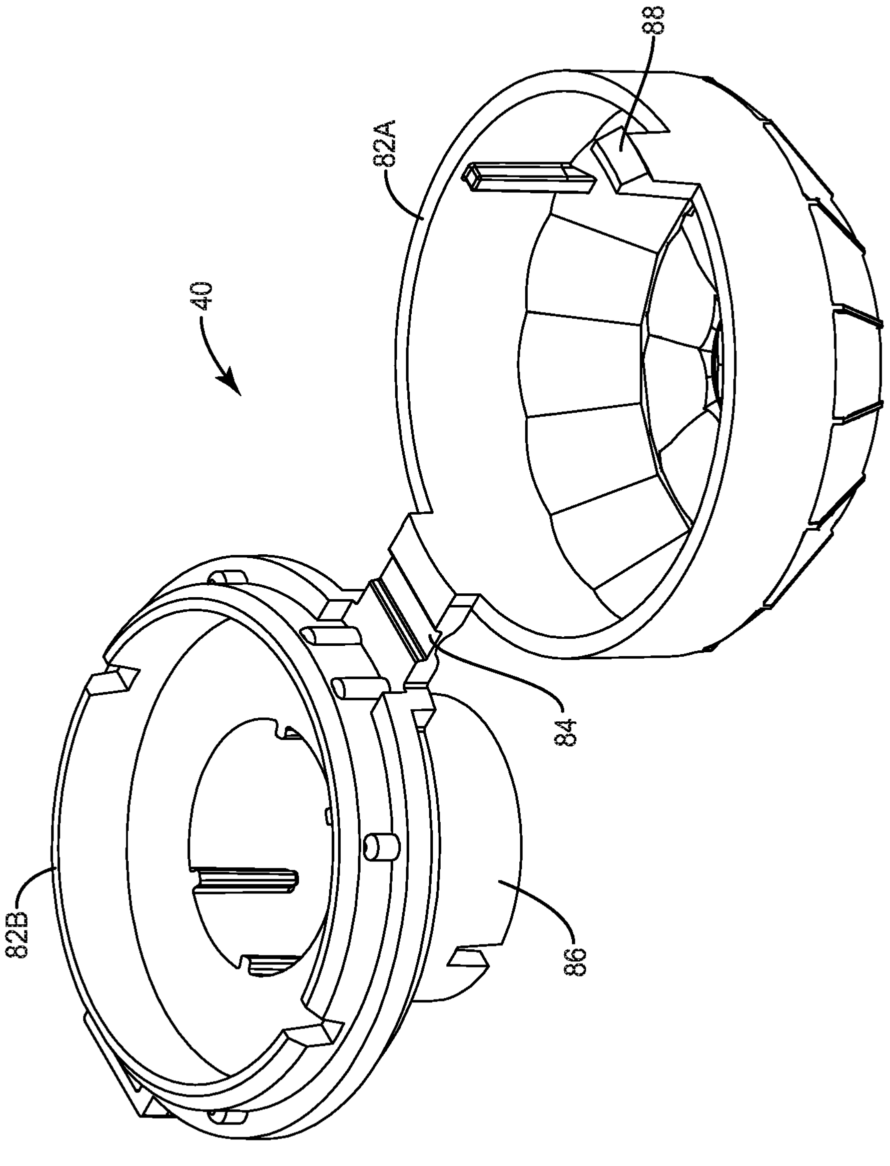
FIGS. 8A through 8C illustrate a sensor cover according to an additional embodiment of the present disclosure.
Figure 8B:
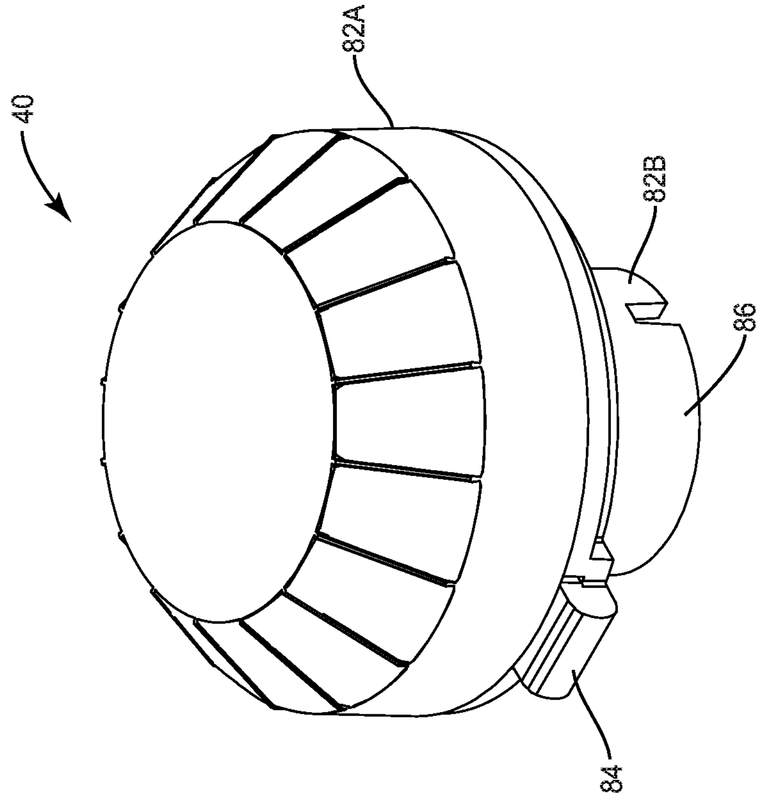
Figure 8C:
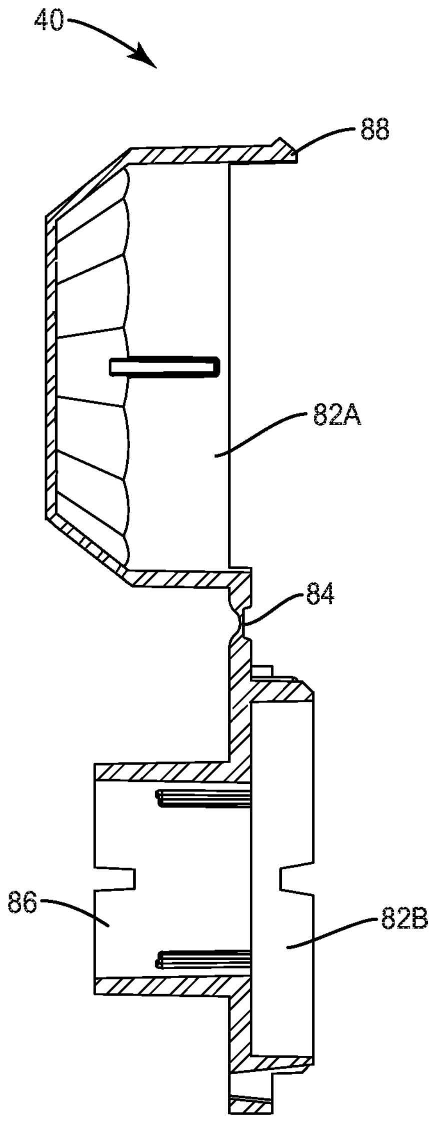

FIGS. 8A through 8C show details of the sensor cover 40 according to one embodiment of the present disclosure. As shown in FIGS. 8A through 8C, the sensor cover 40 may include a top portion 82A and a bottom portion 82B, which are connected by a hinging mechanism 84. The top portion 82A of the sensor cover 40 may include the parallel surface 70 and the angled surface 72, while the bottom portion 82B of the sensor cover 40 may include a tapered end 86 configured to fit around the occupancy sensor 36, and the raised lip 56 configured to secure the sensor cover 40 within the housing 32 of the sensor module 30. A latch 88 may secure the top portion 82A of the sensor cover 40 to the bottom portion 82B thereof when the sensor cover 40 is assembled for use in the sensor module 30.

Those skilled in the art will recognize improvements and modifications to the preferred embodiments of the present disclosure. All such improvements and modifications are considered within the scope of the concepts disclosed herein and the claims that follow.

What is claimed is:

1. A sensor module for a lighting fixture comprising:

a module housing configured to be mounted to the lighting fixture;

a light sensor mounted in the module housing; and a sensor cover over the light sensor and comprising:

a parallel surface oriented to be parallel to a surface on which light from the lighting fixture is provided within an area of interest and comprising a first plurality of lens sections, each of the first plurality of lens sections configured to focus light from a different portion of a first subset of the surface to the light sensor; and an angled surface surrounding the parallel surface and angled away from the surface, the angled surface comprising a second plurality of lens sections each forming a different facet of the angled surface and configured to focus light from a different portion of a second subset of the surface to the light sensor.

2. The sensor module of claim 1 wherein the light sensor is an infrared occupancy sensor.

3. The sensor module of claim 1 wherein each one of the first plurality of lens sections and the second plurality of lens sections comprises a Fresnel lens.

4. The sensor module of claim 3 wherein each one of the first plurality of lens sections has a Fresnel pattern, which is different from a Fresnel pattern of each one of the second plurality of lens sections.

5. The sensor module of claim 1 wherein the parallel surface of the sensor cover is substantially flat.

6. The sensor module of claim 1 further comprising an additional light sensor.

7. The sensor module of claim 6 further comprising a light pipe configured to direct light from the area of interest to the additional light sensor.

8. The sensor module of claim 7 wherein the additional light sensor is an ambient light sensor.

9. The sensor module of claim 1 wherein each one of the first plurality of lens sections and the second plurality of lens sections are configured to pass substantially the same amount of light to the light sensor.

10. The sensor module of claim 1 wherein the first plurality of lens sections and the second plurality of lens sections collectively have a uniform field of view corresponding to a circular area greater than 706 $ft^2$ for a working distance of about 12.5 ft.

11. The sensor module of claim 1 wherein the first plurality of lens sections and the second plurality of lens sections collectively have a uniform field of view corresponding to a circular area greater than 1385 $ft^2$ for a working distance of about 21.5 ft.

12. The sensor module of claim 1 wherein each one of the first plurality of lens sections is configured to pass substantially the same amount of light as each one of the second plurality of lens sections such that the amount of light passed by each one of the first plurality of lens sections differs from the amount of light passed by each one of the second plurality of lens sections by less than about $6.5*10^{-8}$ $W/mm^2$.

13. A lighting fixture comprising:

a light source;

a housing coupled to the light source and comprising an opening through which light generated by the light source is emitted onto a surface within an area of interest; and a module housing configured to be mounted to the lighting fixture and comprising;

a light sensor mounted in the module housing; and a sensor cover over the light sensor, the sensor cover configured to focus light from at least a portion of the surface within the area of interest and having a uniform field of view greater than about 706 $ft^2$ for a working distance of about 12.5 ft.

14. The lighting fixture of claim 13 wherein the sensor cover has a uniform field of view greater than about 1385 $ft^2$ for a working distance of about 21.5 ft.

15. The lighting fixture of claim 13 wherein the sensor cover comprises:

a parallel surface oriented to be parallel to the surface and comprising a first plurality of lens sections, each of the first plurality of lens sections configured to focus light from a different portion of a first subset of the surface to the light sensor; and an angled surface surrounding the parallel surface and angled away from the surface, the angled surface comprising a second plurality of lens sections each forming a different facet of the angled surface and configured to focus light from a different portion of a second subset of the surface to the light sensor.

16. The lighting fixture of claim 15 wherein each one of the first plurality of lens sections and the second plurality of lens sections comprises a Fresnel lens.

17. The lighting fixture of claim 16 wherein each one of the first plurality of lens sections has a Fresnel pattern, which is different from a Fresnel pattern of each one of the second plurality of lens sections.

18. The lighting fixture of claim 15 wherein the parallel surface of the sensor cover is substantially flat.

19. The lighting fixture of claim 15 wherein each one of the first plurality of lens sections is configured to pass substantially the same amount of light as each one of the second plurality of lens sections such that the amount of light passed by each one of the first plurality of lens sections differs from the amount of light passed by each one of the second plurality of lens sections by less than about $6.5*10^{-8}$ $W/mm^2$.

20. The lighting fixture of claim 13 wherein the light sensor is an infrared occupancy sensor.

21. The lighting fixture of claim 13 further comprising control circuitry configured to receive one or more measurements from the light sensor and adjust a light output of the light source based on the one or more measurements.

22. The lighting fixture of claim 13 further comprising an additional light sensor.

23. The lighting fixture of claim 22 further comprising a light pipe configured to direct light from the area of interest to the additional light sensor.

24. The lighting fixture of claim 23 wherein the additional light sensor is an ambient light sensor.

* * * * *